(12) United States Patent
Ohnishi et al.

(10) Patent No.: US 8,741,489 B2
(45) Date of Patent: Jun. 3, 2014

(54) SEPARATOR FOR LITHIUM ION SECONDARY BATTERY, METHOD FOR MANUFACTURE THEREOF, AND LITHIUM ION SECONDARY BATTERY

(75) Inventors: Hiroshi Ohnishi, Oyama (JP); Te Hyon Cho, Kuki (JP); Yuka Kondo, Kusatu (JP); Yoshikazu Miyata, Yokohama (JP); Tatsuo Nakamura, Ouragunitakura-machi (JP); Hiroaki Yamazaki, Tochigi (JP); Masanao Tanaka, Kazo (JP)

(73) Assignee: Japan Vilene Company, Ltd., Tokyo (JP)

( * ) Notice: Subject to any disclaimer, the term of this patent is extended or adjusted under 35 U.S.C. 154(b) by 0 days.

(21) Appl. No.: 13/063,597

(22) PCT Filed: Sep. 11, 2009

(86) PCT No.: PCT/JP2009/065908
§ 371 (c)(1),
(2), (4) Date: Mar. 11, 2011

(87) PCT Pub. No.: WO2010/029994
PCT Pub. Date: Mar. 18, 2010

(65) Prior Publication Data
US 2011/0171535 A1    Jul. 14, 2011

(30) Foreign Application Priority Data
Sep. 12, 2008 (JP) .................................. 2008-235773

(51) Int. Cl.
*H01M 2/16* (2006.01)
(52) U.S. Cl.
USPC ........................................... 429/247; 429/249
(58) Field of Classification Search
USPC ............. 429/231.95, 129, 249, 247; 427/58; 977/773
See application file for complete search history.

(56) References Cited

U.S. PATENT DOCUMENTS

| 6,447,958 | B1 |  | 9/2002 | Shinohara et al. |  |
| 2002/0045091 | A1 | * | 4/2002 | Kamei et al. | ..................... 429/62 |
| 2005/0255769 | A1 |  | 11/2005 | Henninge et al. |  |
| 2007/0099072 | A1 |  | 5/2007 | Hennige et al. |  |
| 2007/0148552 | A1 |  | 6/2007 | Ikemoto et al. |  |
| 2007/0264577 | A1 |  | 11/2007 | Katayama et al. |  |
| 2008/0032197 | A1 | * | 2/2008 | Horpel et al. | ................. 429/224 |
| 2008/0182933 | A1 |  | 7/2008 | Shimizu et al. |  |
| 2009/0067119 | A1 |  | 3/2009 | Katayama et al. |  |
| 2009/0155678 | A1 | * | 6/2009 | Less et al. | ..................... 429/144 |
| 2010/0173187 | A1 | * | 7/2010 | Nishikawa et al. | ........... 429/129 |
| 2010/0291292 | A1 |  | 11/2010 | Hennige et al. |  |

FOREIGN PATENT DOCUMENTS

| CN | 1479392 A | 3/2004 |
| CN | 101080453 A | 11/2007 |
| CN | 101160677 A | 4/2008 |
| JP | 2000-007425 A | 1/2000 |
| JP | 2000-030686 A | 1/2000 |
| JP | 2006-164761 A | 6/2006 |
| JP | 2007-509464 A | 4/2007 |
| JP | 2008-210541 A | 9/2008 |
| JP | 2005-536658 A | 12/2008 |
| JP | 2009-231281 A | 10/2009 |
| WO | 2005061599 A1 | 7/2005 |

OTHER PUBLICATIONS

International Search Report for PCT/JP2009/065908 dated Dec. 1, 2009.
Uchida et al., "Applications Development of Advanced Alumina Sumicorundum®," *Sumitomo Chemical Technical Magazine*, May 25, 2000, pp. 45-49, 2000-I, Japan.

* cited by examiner

*Primary Examiner* — Mark F Huff
*Assistant Examiner* — Monique Wills
(74) *Attorney, Agent, or Firm* — Heslin Rothenberg Farley & Mesiti P.C.

(57) ABSTRACT

Disclosed are a separator for lithium ion secondary batteries, having an inorganic layer formed from inorganic particles, characterized in that the inorganic particles have a particle diameter distribution in which the 50% cumulative particle diameter $D_{50}$ is in the range of 100 nm to 500 nm, the 10% cumulative particle diameter $D_{10}$ is $0.5D_{50}$ or more, and the 90% cumulative particle diameter $D_{90}$ is $2D_{50}$ or less; a method for manufacturing the separator; and a lithium ion secondary battery using the separator. When the separator is used, there can be produced a lithium ion secondary battery in which a short circuit caused by contraction or melting can be definitely prevented, as well as the current density applied to the electrodes during charging and discharging is uniform so that charging and discharging can be efficiently achieved.

10 Claims, No Drawings

SEPARATOR FOR LITHIUM ION SECONDARY BATTERY, METHOD FOR MANUFACTURE THEREOF, AND LITHIUM ION SECONDARY BATTERY

CROSS REFERENCE TO RELATED APPLICATIONS

This application is a national stage filing under section 371 of International Application No. PCT/JP2009/065908 filed on Sep. 11, 2009, and published in Japanese on Mar. 18, 2010 as WO 2010/029994 and claims priority of Japanese application No. 2008-235773 filed on Sep. 12, 2008. The entire disclosures of each of these applications are incorporated herein by reference.

TECHNICAL FIELD

The present invention relates to a separator for lithium ion secondary batteries, a method for manufacturing the separator, and a lithium ion secondary battery. More particularly, the invention relates to a separator capable of the production of a lithium ion secondary battery in which the current density applied to the electrodes during charging and discharging is uniform so that charging and discharging can be efficiently achieved, a method for manufacturing the separator, and a lithium ion secondary battery using this separator.

BACKGROUND ART

Along with the progress in the electronic technologies of recent years, small-sized portable electronic devices such as camera-integrated VTRs, mobile phones, and laptop computers have been developed, and there is a strong demand for the development of small-sized and lightweight secondary batteries with high energy densities as portable power supplies.

As one type of secondary batteries that comply with such a demand, there are expectations on non-aqueous electrolyte secondary batteries that use light metals such as lithium, sodium and aluminum, which can generate high voltage in theory and have high energy densities, as negative active materials. Among them, active research and development is being conducted on lithium ion secondary batteries in which charging and discharging of lithium ions is carried out by means of a non-aqueous electrolyte liquid, as secondary batteries that are capable of realizing higher output and higher energy density when compared with nickel-cadmium batteries or lead-acid batteries, which are aqueous solution-based electrolyte secondary batteries.

Since these lithium ion secondary batteries have large internal energy, they are required of high safety at the time of abnormalities such as an internal short circuit or an external short circuit. Thus, for this purpose of safety measures, polyolefin-based microporous membranes have been put to use. This is because these microporous membranes are thought to have a function of closing pores at the time of abnormal heat generation, and thereby blocking the electricity flow (shutdown function). However, a situation may be considered in which abnormal heat generation is not halted even though such safety measures are being taken, the polyolefin-based microporous membrane undergoes contraction or melting, so that electrodes are brought into contact and short-circuited, causing a fire.

Suggested as separators which can be expected to have an ability to prevent a short circuit caused by contraction or melting as in the case of such a polyolefin-based microporous membrane, are those produced by providing a ceramic film or the like on a support (Patent Literatures 1 and 2).

CITATION LIST

Patent Literature

[Patent Literature 1] Japanese Translation Publication (Kohyo) 2007-509464
[Patent Literature 2] Japanese Translation Publication (Kohyo) 2005-536658

SUMMARY OF INVENTION

Technical Problem

The separators disclosed in these patent literatures are basically produced by applying a mixed solution obtained by mixing oxide particles having an average particle diameter of 0.5 µm or more, with a sol solution, on a porous support such as a non-woven fabric, and thereby coating an oxide on the porous support. In these patent literatures, it is disclosed that since the particle diameter distribution of the oxide particles is broad, it is preferable to use oxide particles which have been classified by air classification, wet classification or centrifugation.

However, even if oxide particles that have been classified by such methods as disclosed therein are used, because the particle diameter distribution of the oxide particles is broad, a separator using such oxide particles is to have a broad pore diameter distribution. Moreover, since such oxide particles are fixed with a sol, the presence of this sol makes the separator to have even a broader pore diameter distribution. As such, if the pore diameter distribution is broad, the current density applied to the electrodes during charging and discharging is non-uniform, and there occur sites where the current density is strongly applied, and sites where the current density is weakly applied. This leads not only to inefficient charging and discharging, but also to premature deterioration of electrodes.

The present invention was made under such circumstances, and it is an object of the present invention to provide a separator capable of the production of a lithium ion secondary battery in which a short circuit caused by contraction or melting can be definitely prevented, and also the current density applied to the electrodes during charging and discharging is uniform so that charging and discharging can be efficiently achieved, a method for manufacturing the separator, and a lithium ion secondary battery.

Solution to Problem

The present invention relates to:
[1] a separator for lithium ion secondary batteries, having an inorganic layer formed from inorganic particles, wherein the inorganic particles have a particle diameter distribution in which the 50% cumulative particle diameter $D_{50}$ is in the range of 100 nm to 500 nm, the 10% cumulative particle diameter $D_{10}$ is $0.5D_{50}$ or more, and the 90% cumulative particle diameter $D_{90}$ is $2D_{50}$ or less;
[2] the separator for lithium ion secondary batteries of item [1], having the inorganic layer on a porous base material;
[3] the separator for lithium ion secondary batteries of item [2], wherein inorganic particles are present also in the voids of the porous base material;
[4] a method for manufacturing a separator for lithium ion secondary batteries, the method including applying, on a porous base material, a dispersion liquid containing inorganic particles having a particle diameter distribution in which the 50% cumulative particle diameter $D_{50}$ is in the range of 100 nm to 500 nm, the 10% cumulative particle diameter $D_{10}$ is $0.5D_{50}$ or more, and the 90% cumulative particle diameter $D_{90}$ is $2D_{50}$ or less; drying the dispersion liquid; and thereby forming an inorganic layer formed from inorganic particles on a porous base material, wherein a dispersion medium having a surface contractile force, which acts on the inorganic layer formed from inorganic particles during drying, of 20 kg/cm² or more is used; and

[5] a lithium ion secondary battery using the separator for lithium ion secondary batteries according to any one of items [1] to [3].

Advantageous Effects of Invention

The invention of the item [1] of the present invention was made by finding that since an inorganic layer formed from inorganic particles having a particle diameter with less fluctuation, which are known to have a particle diameter distribution in which the 50% cumulative particle diameter $D_{50}$ is as small as 100 nm to 500 nm, the 10% cumulative particle diameter $D_{10}$ is $0.5D_{50}$ or more, and the 90% cumulative particle diameter $D_{90}$ is $2D_{50}$ or less, has a pore diameter distribution with less fluctuation, a lithium ion secondary battery in which the current density applied to the electrodes during charging and discharging is uniform so that charging and discharging can be efficiently achieved, can be produced.

Furthermore, the inorganic layer is composed of inorganic particles, the inorganic layer has excellent heat resistance and thus can prevent a short circuit caused by contraction or melting.

The invention of the item [2] of the present invention imparts flexibility to the separator by providing a porous base material, so that destruction of the inorganic layer does not occur even when the separator is bent, and an inorganic layer having a uniform pore diameter distribution can be maintained.

The invention of the item [3] of the present invention was made by finding that when charging of lithium ions is carried out, lithium dendrites (needle-shaped crystals of lithium metal) are produced on the surface of the negative electrode, but the migration of the inorganic particles forming the inorganic layer as caused by the lithium dendrites can be prevented by having inorganic particles also in the voids of the porous base material, thereby short circuit resistance being improved.

The invention of the item [4] of the present invention can produce the separator for lithium ion secondary batteries of the item [2] or [3].

The invention of the item [5] of the present invention is a lithium ion secondary battery in which the current density applied to the electrodes during charging and discharging is uniform so that charging and discharging can be efficiently achieved, and a short circuit caused by contraction or melting does not easily occur.

DESCRIPTION OF EMBODIMENTS

The separator for lithium ion secondary batteries (hereinafter, simply referred to as "separator") of the present invention has an inorganic layer formed from inorganic particles, and therefore, the separator has excellent heat resistance and can effectively prevent a short circuit caused by contraction or melting. Furthermore, these inorganic particles are very fine particles such that the 50% cumulative particle diameter $D_{50}$ is in the range of 100 nm to 500 nm, and are also inorganic particles having a particle diameter with a particle diameter distribution in which the 10% cumulative particle diameter $D_{10}$ is $0.5D_{50}$ or more, and the 90% cumulative particle diameter $D_{90}$ is $2D_{50}$ or less. Accordingly, an inorganic layer formed from such inorganic particles has a small pore diameter. Furthermore, the inorganic layer is a layer having a pore diameter with less fluctuation in the pore diameter. Therefore, a lithium ion secondary battery in which the current density applied to the electrodes during charging and discharging is uniform so that charging and discharging can be efficiently achieved, can be produced.

If the 50% cumulative particle diameter $D_{50}$ of the inorganic particles is less than 100 nm, as the pore diameter of the inorganic layer decreases, the pore volume of the pores also decreases, causing resistance to the migration of lithium ions, which is carried out by means of a non-aqueous electrolyte liquid, and the high-rate discharging characteristics are deteriorated. If the 50% cumulative particle diameter is more than 500 nm, particles fall out, pinholes are likely to occur, and fluctuation of the pore diameter of the inorganic layer increases. Therefore, the 50% cumulative particle diameter $D_{50}$ needs to be in the range of 100 nm to 500 nm, and the 50% cumulative particle diameter $D_{50}$ is preferably in the range of 100 nm to 430 nm, and more preferably in the range of 200 nm to 430 nm.

Furthermore, since an inorganic layer formed from inorganic particles having a particle diameter distribution in which the 10% cumulative value $D_{10}$ is less than $0.5D_{50}$ or the 90% cumulative value $D_{90}$ is more than $2D_{50}$, is subject to the generation of cracks or pinholes, the inorganic particles need to be inorganic particles having a particle diameter distribution in which the 10% cumulative value $D_{10}$ is $0.5D_{50}$ or more and the 90% cumulative value $D_{90}$ is $2D_{50}$ or less. This tendency is prone to occur when an inorganic layer is formed by drying a dispersion liquid of inorganic particles. This is thought to be because a contractile force of the inorganic particles occurs during drying, and when the extent of fluctuation in the particle diameter is large, there is a difference in the contractile force, so that cracks or pinholes are likely to be generated. Preferably, the inorganic particles have a particle diameter distribution in which the 10% cumulative value $D_{10}$ is $0.51D_{50}$ or more, and the 90% cumulative value $D_{90}$ is $1.95D_{50}$ or less; and more preferably, the inorganic particles have a particle diameter distribution in which the 10% cumulative value $D_{10}$ is $0.6D_{50}$ or more, and the 90% cumulative value $D_{90}$ is $1.65D_{50}$ or less.

The particle diameter distribution according to the present invention refers to a particle diameter distribution obtained by performing a continuous measurement for 3 minutes by a dynamic light scattering method using FPRA1000 (measurement range 3 nm to 5000 nm) manufactured by Otsuka Electronics Co., Ltd., and calculating the measurement data in terms of weight. In addition, the measurement is performed 5 times, the data obtained by the measurement are sorted in order of decreasing width of the particle diameter distribution, and the datum of the intermediate value (the third) is taken as the measurement value for the relevant particles. Furthermore, the dispersion liquid is adjusted to a temperature of 25° C.; and the refractive index and viscosity of the solvent are values obtained using the values of water at 25° C. The terms "10% cumulative particle diameter $D_{10}$", "50% cumulative particle diameter $D_{50}$", and "90% cumulative particle diameter $D_{90}$" mean the particle diameter of the $1^{st}$ decile, the particle diameter of the $5^{th}$ decile (median), and the particle diameter of the $9^{th}$ decile, respectively, when the diameters of the particles contained in the dispersion liquid are integrated in order from smaller particles and expressed in decile ranks.

Such inorganic particles may be any inorganic particles having excellent electrolyte resistance and oxidation resistance. There are no particular limitations on the inorganic particles, but the particles may be composed of, for example, silicon dioxide, titanium oxide, aluminum oxide, zirconium oxide, calcium oxide, or a composite oxide thereof, and can be composed of inorganic particles of a single kind or inorganic particles of two or more kinds among these. In regard to the shape of the inorganic particles, particles of an identical shape are preferred because it is preferable that the pore diameter of the inorganic layer to be formed is uniform, and particularly, a spherical shape, and more particularly a true spherical shape, is preferred.

The inorganic particles having a small particle diameter with a narrow particle diameter distribution of the present invention can be produced by a known method. Examples of the method include a method such as disclosed in Japanese Patent Application Laid-Open (JP-A) No. 9-67114, in which an aqueous silica sol having a particle diameter of 20 nm or more is mixed with an aqueous alkali silicate solution and/or an aqueous alkali solution to give a heel solution; an aqueous silica sol having a particle diameter of 6 to 10 nm, a $SiO_2$ concentration of 8 to 20% by weight, and a pH value of 2 to 5 is provided as a feed solution; the heel solution is placed in a vessel; while the heel solution is maintained at 90° C. or higher, the feed solution is added to the heel solution; and thereby the particle diameter of the silica particles in the heel solution is grown; and a method such as disclosed in JP-A No. 2005-60217, in which a silica sol is prepared by adding an organic solvent containing tetramethoxysilane and a solvent containing an alkali catalyst and water, to an organic solvent containing an alkali catalyst and water, and thereby subjecting tetramethoxysilane to hydrolysis and polycondensation.

The inorganic layer of the present invention is formed from inorganic particles such as described above, but it is particularly preferable for the inorganic layer to be formed only of inorganic particles. For example, if the inorganic layer contains an adhesive such as a sol as in conventional cases, the adhesive covers the inorganic particles, and therefore, the size of the pore diameter of the inorganic layer becomes non-uniform as compared with the size of the pore diameter of an inorganic layer formed only of inorganic particles, resulting in a broad pore diameter distribution. Consequently, the current density applied to the electrodes during charging and discharging is non-uniform, and there is a tendency that charging and discharging cannot be achieved efficiently.

As discussed above, the pore diameter distribution of the inorganic layer of the present invention exhibits a sharper distribution than an inorganic layer containing an adhesive such as a sol. The range of values showing the peak of the pore diameter for the inorganic layer of the present invention can be appropriately selected in accordance with the uses of the lithium ion secondary battery to be produced.

The values showing the peak of the pore diameter of a separator having this inorganic layer are consistent with the median diameter, because the pore diameter distribution of the inorganic layer is sharp. The range of values showing the peak of the pore diameter (median diameter) of a separator having this inorganic layer, preferably lies between 0.04 μm to 0.08 μm.

Here, the pore diameter distribution refers to the pore diameter distribution obtained when measurement is made with a mercury porosimeter (manufactured by Shimadzu Corp.; AutoPore IV 9510 type) in the range of 0.003 μm to 10 μm.

The pore diameter distribution of the inorganic layer formed from inorganic particles has a fluctuation in the range due to the particle diameter distribution of the inorganic particles, and is expressed by the following formula, according to the theoretical formula of Kozeny-Carman:

Equivalent diameter (Pore diameter)=4×space volume in a packed layer/total specific surface area of all particles For example, in the case where the inorganic particles are silica particles, if it is assumed that the silica density is 2.33 g/cc, the porosity upon closest packing is 26%, and the inorganic particles are composed only of particles having a particle diameter of 500 nm (100%), the theoretical calculated value of the pore diameter is 0.636 μm.

If it is assumed that the inorganic particles are composed only of particles having a particle diameter of 100 nm (100%), the theoretical calculated value of the pore diameter is 0.127 μm. Furthermore, in regard to the packability of particles in general, as compared with inorganic particles having a single particle diameter, inorganic particles having two or more kinds of particle diameters have a more coordination number with respect to a certain inorganic particle (number of contact sites with the surface of one inorganic particle) and can be packed more densely, resulting in a lower porosity. As a result, the pore diameter is further reduced. Therefore, according to the present invention, an inorganic layer having a smaller pore diameter than 0.127 μm to 0.636 μm can be formed.

The separator of the present invention can be constructed only from an inorganic layer such as described above, but it is preferable that the separator have a porous base material which imparts flexibility to the separator so as to prevent destruction of the inorganic layer even if the separator is bent, and to maintain an inorganic layer having a uniform pore diameter distribution, and that the separator have the inorganic layer on this porous base material. As such, in the case where the separator has the inorganic layer on a porous base material, when the separator is observed from the inorganic layer side, observation of the porous base material cannot be made, and the separator is in a state in which only the inorganic particles constituting the inorganic layer are observed.

There are no particular limitations on the porous base material of the present invention, but preferable examples of the constituent material of the porous base material include organic resins such as polyolefin-based resins, polyester-based resins, and nylon-based resins (including wholly aromatic polyamide resins); and inorganic resins, all of which have electrolyte resistance and oxidation resistance. The structure of the porous base material may be, for example, a woven fabric, a knitted fabric, or a non-woven fabric. In the case of a woven fabric or a knitted fabric, the base material is obtained by processing fibers made of one or more of the resins mentioned above using a weaving machine or a knitting machine. Furthermore, in the case of a non-woven fabric, the base material is obtained by a thy-laid method, a spun-bonded method, a melt blown method, a flash spinning method, a wet-laid method, an electrospinning method or the like, which are conventional methods for producing non-woven fabrics. It is also acceptable to subject the non-woven fabric to a mechanical entangling treatment such as hydroentangling or needle punching. Furthermore, the non-woven fabric may also be partially bonded by passing the non-woven fabric between a heated smooth roll and a heated embossed roll. A plural number of the above-described fiber sheets of different types may also be laminated and thereby integrated.

In the case of a separator having a porous base material as well, it is preferable that inorganic particles be present even in the pores of the porous base material. When charging of lithium ions is carried out, lithium dendrites (needle-shaped crystals of lithium metal) are produced on the surface of the negative electrode. However, when inorganic particles are present also in the voids of the porous base material, migration of the inorganic particles that form the inorganic layer caused by lithium dendrites, can be prevented, and short circuit resistance can be improved. Furthermore, when the inorganic layer is formed by applying a dispersion liquid of inorganic particles on a porous base material, and drying the dispersion liquid, since inorganic particles are bonded by the contractile force occurring upon drying from the dispersion liquid, it is preferable that inorganic particles be present also in the voids of the porous base material, rather than to have the inorganic layer formed only on the surface of the porous base material. That is, it is preferable that inorganic particles be present also in the voids of the porous base material, because a firmly bonded body of the porous base material and the inorganic particles can be formed. Particularly, when inorganic particles are present in those voids that are adjacent to the inorganic layer on the porous base material, the above-described effects are exhibited in an excellent manner. Moreover, when inorganic particles are present in the entire voids of the porous base material, the above-described effects are exhibited in a more excellent manner.

These inorganic particles may be identical with or different from the inorganic particles that constitute the inorganic layer, but in the case of forming the inorganic layer by applying a dispersion liquid of inorganic particles on a porous base material and drying the dispersion liquid, the inorganic particles are bonded by the contractile force that occurs upon drying. In this case, it is preferable to use identical inorganic particles, rather than to use different inorganic particles, because the repulsion of the particles due to a difference in the zeta potential, a reduction in the contractile force due to a difference in the particle diameter, and the like can be suppressed.

The thickness of the separator of the present invention can be appropriately selected in accordance with the uses of the lithium ion secondary battery, and the thickness is generally about 10 μm to 50 μm.

A suitable separator of the present invention having an inorganic layer on a porous base material, can be produced by, for example, applying, on a porous base material, a dispersion liquid containing inorganic particles having a particle diameter distribution in which the 50% cumulative particle diameter $D_{50}$ is in the range of 100 nm to 500 nm, the 10% cumulative particle diameter $D_{10}$ is $0.5D_{50}$ or more, and the 90% cumulative particle diameter $D_{90}$ is $2D_{50}$ or less, and drying the dispersion liquid.

More specifically, first, a dispersion liquid containing inorganic particles having a particle diameter distribution in the range described above is provided. It is important to use, as a dispersion medium of this dispersion liquid, a dispersion medium having a surface contractile force, which acts on the inorganic layer formed from inorganic particles during drying, of 20 kg/cm² or more. It is because, as the dispersion medium of the dispersion liquid is a medium having a surface contractile force such as described above, even in the case where the dispersion liquid does not contain a binder or the like and has only inorganic particles dispersed therein, when the porous base material applied with the dispersion liquid is dried, the contractile force acts on the pore diameter formed by the inorganic particles toward the center of the porous base material in the thickness direction, causing the inorganic particles to aggregate and to be bonded to each other, and thereby an inorganic layer formed from inorganic particles can be formed. This surface contractile force value of 20 kg/cm² or more is a value obtained as a result of an experiment, and since a larger surface contractile force can more easily provide the action described above, the surface contractile force is preferably 30 kg/cm² or more, and more preferably 50 kg/cm² or more. Furthermore, there are no particular limitations on the upper limit of the surface contractile force, but the surface contractile force is preferably 75 kg/cm² or less.

This surface contractile force P can be represented by the following formula:

$$P = 2 \times Ts/Rp$$

Here, P represents the surface contractile force (unit: kg/cm²); Ts represents the surface tension (unit: mN/m) of the dispersion medium; and Rp represents the pore radius (unit: m) formed by the inorganic particles. In addition, the pore radius refers to the radius determined from the medium diameter obtained when the pore diameter of the inorganic layer is measured by the method described above (mercury porosimeter).

As can be seen from this formula for surface contractile force, the surface contractile force can be controlled by adjusting the surface tension of the dispersion medium. For example, the surface tension of the dispersion medium can be adjusted by adding a surfactant, an alcohol, a strong acid, a strong alkali or the like to the dispersion medium, and consequently, the surface contractile force can be controlled. Among these, an alcohol which can be uniformly dispersed in the dispersion medium is suitable. There are no particular limitations on the type of this suitable alcohol, and examples include ethanol, methanol, and propanol.

The liquid property of the dispersion liquid is not particularly limited to acidity, neutrality or alkalinity, but neutrality and alkalinity by which the inorganic particles can be dispersed at a relatively high concentration, are preferred, while alkalinity is particularly preferred.

Next, the dispersion liquid is applied on a porous base material, and examples of the method of application include a method of immersing the porous base material in the dispersion liquid, and a method of applying the dispersion liquid on the porous base material. Among these, a method of immersing the porous base material in the dispersion liquid is suitable because the dispersion liquid penetrates even into the minute spaces inside the porous base material, and a separator in which inorganic particles are present also in the interior of the porous base material, can be produced. In addition, if it is intended to form an inorganic layer formed only of inorganic particles only on the porous base material, a compact base material made of nanofibers or the like, or a base material having the surface subjected to a hydrophobization treatment may be provided as a porous base material, and a dispersion liquid having the viscosity increased by concentrating the dispersion liquid and thereby increasing the inorganic particle concentration, may be used for application or immersion.

Then, the porous base material to which the dispersion liquid has been applied is dried, and thereby a separator having an inorganic layer on a porous base material can be produced. There are no particular limitations on this method of drying, and drying may be carried out by air drying. However, from the viewpoint of productivity efficiency, it is preferable to use a drying apparatus. Examples of this drying apparatus include an oven dryer and a far-infrared heater.

In addition, a separator in which inorganic particles are present also in the voids of the porous base material, can be produced by a method of immersing the porous base material in the dispersion liquid, or a method of applying the dispersion liquid on the porous base material, as described above.

Since the lithium ion secondary battery of the present invention uses the separator of the present invention such as described above, the current density applied to the electrodes during charging and discharging is uniform so that charging and discharging can be efficiently achieved, and a short circuit caused by contraction or melting does not easily occur.

The lithium ion secondary battery of the present invention can have the same configuration as conventional lithium ion secondary batteries, except for using the separator described above. For example, an electrode in which a paste of a lithium-containing metal compound is supported on a collector material, can be used as a positive electrode, and an electrode in which lithium metal or a lithium alloy, a carbonaceous material containing carbon or graphite (for example, a carbonaceous material such as cokes, natural graphite or artificial graphite) which is capable of storing and releasing lithium, and a composite tin oxide, are supported on a collector material, can be used as a negative electrode. Also, a non-aqueous electrolyte liquid prepared by dissolving $LiPF_6$ in a mixed solvent of ethylene carbonate and diethyl carbonate, can be used as an electrolyte liquid. Furthermore, there are no particular limitations on the cell structure of the lithium ion secondary battery, and examples of the cell structure include a laminate type, a cylinder type, an angular type, and a coin type.

EXAMPLES

The present invention now will be further illustrated by, but is by no means limited to, the following Examples.

Example 1

Production of Composite Non-Woven Fabric (Porous Base Material)

A non-woven fabric base having a mass per unit area of 10 g/m² was produced by thermal adhesion between core-sheath type composite fibers, by means of a hot air heat treatment in which fiber webs formed by a wet papermaking method using a core-sheath type composite fiber composed of polypropylene as a core component and polyethylene as a sheath component and having a fineness of 0.8 dtex and a fiber length of 5 mm as a fiber, was passed through hot air at a temperature of 140° C. for 10 seconds. Furthermore, a slurry containing a polypropylene fiber having a fineness of 0.02 dtex and a fiber length of 2 mm and the core-sheath type composite fiber described above at a mass ratio of 80:20, was spread in the manner of papermaking (6 g/m²) on the non-woven fabric sheet, and then the resultant was subjected to a hot air heat treatment by passing the resultant through hot air at a temperature of 140° C. for 15 seconds, to thereby thermally adhere the polypropylene fiber and the core-sheath type composite fiber to the non-woven fabric base. The thermal adhesion product was further subjected to thickness adjustment using a roll calendar. Thus, a composite non-woven fabric having a thickness of 35 μM and a mass per unit area of 16 g/m² was obtained.

(Production of Separator)

A silica sol dispersion liquid (MP-1040, manufactured by Nissan Chemical Industries, Ltd.) having a 50% cumulative particle diameter $D_{50}$ of 100 nm, a 10% cumulative particle diameter $D_{10}$ of 70 nm, and a 90% cumulative particle diameter $D_{90}$ of 130 nm, was provided. 10 g of isopropyl alcohol (hereinafter, indicated as "IPA") was added to 150 g of the dispersion liquid, and the mixture was stirred. Thus, a silica sol dispersion liquid having a water-IPA mixed solvent as a dispersion medium was obtained. The surface tension of this silica sol dispersion medium was 39.2 mN/m (consequently, the surface contractile force was 40 kg/cm²).

Subsequently, the composite non-woven fabric was impregnated with this silica sol dispersion liquid by immersing the fabric in the dispersion liquid, and then the impregnated composite non-woven fabric was air dried. Thus, a separator having an inorganic layer formed only of silica particles on both surfaces (thickness: 46 μm, pore diameter: having a peak at 0.04 μm and distributed between 0.02 μm and 0.08 μm) was produced. In addition, the separator was observed with an electron microscope, and it was found that silica particles were present also in the entire voids, including the voids adjacent to the inorganic layer of the composite non-woven fabric. Furthermore, the silica particles had a true spherical shape.

Example 2

A silica sol dispersion liquid (MP-2040, manufactured by Nissan Chemical Industries, Ltd.) having a 50% cumulative particle diameter $D_{50}$ of 200 nm, a 10% cumulative particle diameter $D_{10}$ of 120 nm, and a 90% cumulative particle diameter $D_{90}$ of 330 nm, was provided. 10 g of IPA was added to 150 g of the dispersion liquid, and the mixture was stirred. Thus, a silica sol dispersion liquid having a water-IPA mixed solvent as a dispersion medium was obtained. The surface tension of this silica sol dispersion medium was 39.2 mN/m (consequently, the surface contractile force was 32 kg/cm²).

Subsequently, the same composite non-woven fabric as that used in Example 1 was impregnated with this silica sol dispersion liquid by immersing the fabric in the dispersion liquid, and then the impregnated composite non-woven fabric was air dried. Thus, a separator having an inorganic layer formed only of silica particles on both surfaces (thickness: 46 μm, pore diameter: having a peak at 0.05 μm and distributed between 0.025 μm and 0.09 μm) was produced. In addition, the separator was observed with an electron microscope, and it was found that silica particles were present also in the entire voids, including the voids adjacent to the inorganic layer of the composite non-woven fabric. Furthermore, the silica particles had a true spherical shape.

Example 3

A silica sol dispersion liquid (MP-4540, manufactured by Nissan Chemical Industries, Ltd.) having a 50% cumulative particle diameter $D_{50}$ of 430 nm, a 10% cumulative particle diameter $D_{10}$ of 220 nm, and a 90% cumulative particle diameter $D_{90}$ of 840 nm, was provided. 10 g of IPA was added to 150 g of the dispersion liquid, and the mixture was stirred. Thus, a silica sol dispersion liquid having a water-IPA mixed solvent as a dispersion medium was obtained. The surface tension of this silica sol dispersion medium was 39.2 mN/m (consequently, the surface contractile force was 20 kg/cm²).

Subsequently, the same composite non-woven fabric as that used in Example 1 was impregnated with this silica sol dispersion liquid by immersing the fabric in the dispersion liquid, and then the impregnated composite non-woven fabric was air dried. Thus, a separator having an inorganic layer formed only of silica particles on both surfaces (thickness: 41 μm, pore diameter: having a peak at 0.08 μm and distributed between 0.2 μm and 0.11 μm) was produced. In addition, the separator was observed with an electron microscope, and it was found that silica particles were present also in the entire voids, including the voids adjacent to the inorganic layer of the composite non-woven fabric. Furthermore, the silica particles had a true spherical shape.

Comparative Example 1

A silica sol dispersion liquid (SP-1B, manufactured by Fuso Chemical Co., Ltd.) having a 50% cumulative particle diameter $D_{50}$ of 800 nm, a 10% cumulative particle diameter $D_{10}$ of 330 nm, and a 90% cumulative particle diameter $D_{90}$ of 1550 nm, was provided. 10 g of IPA was added to 150 g of the dispersion liquid, and the mixture was stirred. Thus, a silica sol dispersion liquid having a water-IPA mixed solvent as a dispersion medium was obtained. The surface tension of this silica sol dispersion medium was 39.2 mN/m (consequently, the surface contractile force was 0.3 kg/cm$^2$).

Subsequently, the same composite non-woven fabric as that used in Example 1 was impregnated with this silica sol dispersion liquid by immersing the fabric in the dispersion liquid, and then the impregnated composite non-woven fabric was air dried. Thus, a separator having an inorganic layer formed only of silica particles on both surfaces (thickness: 35 μm, pore diameter: having a peak at 6.1 μm and distributed between 1.3 μm and 10 μm) was produced. In addition, the separator was observed with an electron microscope, and pinholes caused by the fall-out of silica particles were observed in the inorganic layer, while the porous base material was in the state of being partially exposed.

Comparative Example 2

A silica sol dispersion liquid (registered trademark: Snowtex XL, manufactured by Nissan Chemical Industries, Ltd.) having a 50% cumulative particle diameter $D_{50}$ of 42 nm, a 10% cumulative particle diameter $D_{10}$ of 15 nm, and a 90% cumulative particle diameter $D_{90}$ of 66 nm, was provided. 10 g of IPA was added to 150 g of the dispersion liquid, and the mixture was stirred. Thus, a silica sol dispersion liquid having a water-IPA mixed solvent as a dispersion medium was obtained. The surface tension of this silica sol dispersion medium was 39.2 mN/m (consequently, the surface contractile force was 160 kg/cm$^2$).

Subsequently, the same composite non-woven fabric as that used in Example 1 was impregnated with this silica sol dispersion liquid by immersing the fabric in the dispersion liquid, and then the impregnated composite non-woven fabric was air dried. Thus, a separator having an inorganic layer formed only of silica particles on both surfaces (thickness: 40 μm, pore diameter: having a peak at 0.01 μm and distributed between 0.009 μm and 0.15 μm) was produced. In addition, the separator was observed with an electron microscope, and it was found that silica particles were densely packed in the voids of the composite non-woven fabric. Furthermore, the resulting separator was a glass plate-like separator having inorganic layers that were thickly deposited on the composite non-woven fabric.

Comparative Example 3

50 g each of the dispersion liquids of Examples 1 to 3 were weighed and mixed, and thus a silica sol mixed dispersion liquid having a 50% cumulative particle diameter $D_{50}$ of 215 nm, a 10% cumulative particle diameter $D_{10}$ of 85 nm, and a 90% cumulative particle diameter $D_{90}$ of 650 nm, was obtained. 10 g of IPA was added to 150 g of the mixed dispersion liquid, and the mixture was stirred. Thus, a silica sol dispersion liquid having a water-WA mixed solvent as a dispersion medium was obtained. The surface tension of this silica sol dispersion medium was 39.2 mN/m (consequently, the surface contractile force was 16 kg/cm$^2$).

Subsequently, the same composite non-woven fabric as that used in Example 1 was impregnated with this silica sol dispersion liquid by immersing the fabric in the dispersion liquid, and then the impregnated composite non-woven fabric was air dried. Thus, a separator having an inorganic layer formed only of silica particles on both surfaces (thickness: 52 μm, pore diameter: having a peak at 0.1 μm and broadly distributed in the range of 0.06 μm to 10 μm) was produced.

In addition, the separator was observed with an electron microscope, and it was found that silica particles were densely packed in the voids of the composite non-woven fabric, but there occurred fall-out of inorganic particles at numerous sites of the inorganic layer. Furthermore, the separator thus obtained had no surface gloss and was white in color. When inorganic particles are properly bonded to each other by the surface contractile force, there is no fall-out of inorganic particles or aggregation at the surface, and the separator looks reflective as a film does. Therefore, it was thought that the inorganic particles on the separator were not properly bonded to each other.

Comparative Example 4

75 g each of the dispersion liquids of Examples 1 and 2 were weighed and mixed, and thus a silica sol mixed dispersion liquid having a 50% cumulative particle diameter $D_{50}$ of 130 nm, a 10% cumulative particle diameter $D_{10}$ of 80 nm, and a 90% cumulative particle diameter $D_{90}$ of 300 nm, was obtained. 10 g of IPA was added to 150 g of the mixed dispersion liquid, and the mixture was stirred. Thus, a silica sol dispersion liquid having a water-IPA mixed solvent as a dispersion medium was obtained. The surface tension of this silica sol dispersion medium was 39.2 mN/m (consequently, the surface contractile force was 17.8 kg/cm$^2$).

Subsequently, the same composite non-woven fabric as that used in Example 1 was impregnated with this silica sol dispersion liquid by immersing the fabric in the dispersion liquid, and then the impregnated composite non-woven fabric was air dried. Thus, a separator having an inorganic layer formed only of silica particles on both surfaces (thickness: 55 μm, pore diameter: having a peak at 0.09 μm and broadly distributed in the range of 0.06 μm to 10 μm) was produced. In addition, the separator was observed with an electron microscope, and it was found that silica particles were densely packed in the voids of the composite non-woven fabric. It was not possible to confirm any site where the porous base material was exposed to the separator, but the separator thus obtained had no surface gloss and was white in color. Therefore, it was thought that the inorganic particles on the separator were not properly bonded to each other.

Comparative Example 5

A non-woven fabric formed of a polyester fiber (mass per unit area: 12 g/m$^2$, thickness: 15 μm, average fiber diameter: 6 μm) was provided.

Furthermore, a sol solution composed of the following blend was prepared:

| | |
|---|---|
| Ethanol | 83.5% |
| 5 wt % hydrochloric acid | 7.7% |
| Tetraethoxysilane | 5% |
| Methyltriethoxysilane | 3.8% |

Next, the sol solution and α-alumina particles were mixed such that the solids content mass ratio of the sol solution and the alumina particles (primary particle diameter=1 μm) was 60:40, and thus a binding paste was prepared.

Subsequently, the non-woven fabric was impregnated with this binding paste and was dried with a dryer set at a temperature of 200° C., and then the thickness of the impregnated non-woven fabric was adjusted with a calendar roll pressing machine. Thus, a separator (amount of inorganic components: 22.8 g/m$^2$, mass per unit area: 34.8 g/m$^2$, thickness: 34 μm, pore diameter distribution: having peaks at 0.8 μm and 9 μm and broadly distributed in the range of 0.6 μm to 10 μm) was produced.

Comparative Example 6

The same silica sol dispersion liquid as that used in Example 2 (MP-2040, manufactured by Nissan Chemical Industries, Ltd.) was provided. 90 g of IPA was added to 150 g of the dispersion liquid, and the mixture was stirred. Thus, a silica sol dispersion liquid having a water-IPA mixed solvent as a dispersion medium was obtained. The surface tension of this silica sol dispersion medium was 23.8 mN/m (consequently, the surface contractile force was 19.4 kg/cm$^2$).

Subsequently, the same composite non-woven fabric as that used in Example 1 was impregnated with this silica sol dispersion liquid by immersing the fabric in the dispersion liquid, and then the impregnated composite non-woven fabric was air dried. Thus, a separator having an inorganic layer formed only of silica particles on both surfaces (thickness: 52 μm, pore diameter: having a peak at 0.15 μm and broadly distributed in the range of 0.1 μm to 10 μm) was produced. In addition, the separator was observed with an electron microscope, and it was found that silica particles were densely packed in the voids of the composite non-woven fabric. It was not possible to confirm any site where the porous base material was exposed to the separator, but the separator thus obtained had no surface gloss, was white in color, and felt grainy. Therefore, it was thought that the inorganic particles on the separator were not properly bonded to each other, or had already been aggregated in the dispersion liquid.

Comparative Example 7

The same silica sol dispersion liquid as that used in Example 2 (MP-2040, manufactured by Nissan Chemical Industries, Ltd.) was dried, and thus a dried powder of silica sol was prepared. Subsequently, the dried powder was added to the dispersion liquid of Comparative Example 6 so as to obtain the same solids concentration as that of the dispersion liquid of Example 2, and thus a dispersion liquid of the dried powder was prepared. The surface tension of the dispersion medium of this dispersion liquid was 23.8 mN/m (consequently, the surface contractile force was 19.4 kg/cm$^2$).

Subsequently, the same composite non-woven fabric as that used in Example 1 was impregnated with this silica sol dispersion liquid by immersing the fabric in the dispersion liquid, and then the impregnated composite non-woven fabric was air dried. Thus, a separator having an inorganic layer formed only of silica particles on both surfaces (thickness: 57 μm, pore diameter: having a peak at 0.15 μm and broadly distributed in the range of 0.1 μm to 10 μm) was produced. In addition, the separator was observed with an electron microscope, and it was found that silica particles were densely packed in the voids of the composite non-woven fabric. It was not possible to confirm any site where the porous base material was exposed to the separator, but the separator thus obtained had no surface gloss, was white in color, and felt grainy. Therefore, it was thought that the inorganic particles on the separator were not properly bonded to each other, or had already been aggregated in the dispersion liquid.

(Production of Lithium Ion Secondary Battery)
(Production of Positive Electrode)

87 parts by mass of a spinel lithium manganese oxide (LiMn$_2$O$_4$) powder and 6 parts by mass of acetylene black were mixed, and polyvinylidene fluoride (PVdF) #1120 (an N-methyl-2-pyrrolidone solution at a solids content of 12%) manufactured by Kureha Corp. was added thereto such that the dry parts by weight of PVdF was 7 parts by mass. An appropriate amount of an N-methyl-2-pyrrolidone solution was added thereto, and the mixture was stirred with a degassing stirrer. Thus, a positive electrode material paste was produced. The paste thus obtained was applied on an aluminum foil having a thickness of 20 μm, dried and then pressed. Thus, a positive electrode sheet having a thickness of 90 μm was obtained.

(Production of Negative Electrode)

As a negative electrode active material, 90 parts by mass of a natural graphite powder and polyvinylidene fluoride (PVdF) #9130 (an N-methyl-2-pyrrolidone solution at a solids content of 13%) manufactured by Kureha Corp. were added such that the dry parts by weight of PVdF was 10 parts by mass, and the mixture was stirred with a degassing stirrer. Thus, a negative electrode material paste was produced. The paste thus obtained was applied on a copper foil having a thickness of 15 μm, dried and then pressed. Thus, a negative electrode sheet having a thickness of 70 μm was obtained.

(Non-Aqueous Electrolyte Liquid)

As an electrolyte liquid, a non-aqueous electrolyte solution (manufactured by Kishida Chemical Co., Ltd.) having LiPF$_6$ dissolved in an ethylene carbonate/diethyl carbonate mixed solvent (50:50) to a concentration of 1 mole/L, was provided.

(Production of Battery)

Lithium ion secondary batteries (2030 type coin cells) were produced using the positive electrode, negative electrode, electrolyte liquid, and respective separators described above.

(Battery Performance Tests)
1. Cycle test

A lithium ion secondary battery was produced, and then was left to stand for one day at room temperature. Subsequently, the lithium ion secondary battery was subjected to 5 cycles of charging and discharging, one cycle being composed of charging with a constant current of 0.2 C until a cutoff voltage of 4.2 V, and then constant current discharging at 0.2 C. The presence or absence of internal short circuits after one cycle of this charging and discharging process, and the presence or absence of internal short circuits after 5 cycles, were respectively examined.

Subsequently, for a battery which did not have any internal short circuit even after 5 cycles, charging and discharging was continued with a constant current of 0.2 C, and thus the discharge capacity retention ratio after 50 cycles was examined. These results were as shown in Table 2.

2. Rate Characteristic Test

The presence or absence of internal short circuits after 1 cycle and after 5 cycles was examined in the same manner as in the cycle test, and those which did not have any internal short circuit were subjected to a rate test.

In the rate test, a battery was subjected to 5 cycles of charging and discharging, one cycle being composed of constant current/constant voltage charging (6 hours) at 0.2 C and 4.2 V, and then constant current discharging at 8 C. The average value of the respective capacity retention ratios after 2 to 5 cycles was designated as the capacity retention ratio. These results were as shown in Table 2.

3. Measurement of Contraction Ratio

A circular specimen (diameter: 16 mm) of the separator of Example 2 was left to stand in an oven set at a temperature of 160° C. for 20 minutes, and the contraction ratio of the specimen in the longitudinal direction (flow direction during the production) before and after the standing was calculated. As a result, the contraction ratio of the separator of Example 2 was 5%.

TABLE 1

(Characteristics of separators)

| Unit | Mass per unit area g/m$^2$ | Thickness μm | Porosity % | Fiber mass % | Powder mass % | Pore diameter[#] μm | Surface contractile force kg/cm$^2$ |
|---|---|---|---|---|---|---|---|
| Example 1 | 47 | 46 | 35.6 | 34 | 66 | 0.04 | 40 |
| Example 2 | 46.2 | 46 | 36.3 | 35 | 65 | 0.05 | 32 |
| Example 3 | 39 | 41 | 36.1 | 41 | 59 | 0.08 | 20 |
| Comparative Example 1 | 20 | 35 | 48.4 | 80 | 20 | 6.1 | 0.3 |
| Comparative Example 2 | 50 | 40 | 22.7 | 32 | 68 | 0.01 | 160 |
| Comparative Example 3 | 40.4 | 52 | 48.5 | 40 | 60 | 0.1 | 16 |
| Comparative Example 4 | 44.5 | 55 | 48.1 | 36 | 64 | 0.09 | 17.8 |
| Comparative Example 5 | 34.8 | 34 | 35.2 | 34 | 66 | 0.8 and 9 | — |
| Comparative Example 6 | 43.7 | 52 | 45.7 | 37 | 63 | 0.15 | 19.4 |
| Comparative Example 7 | 48.8 | 57 | 46.7 | 33 | 67 | 0.15 | 19.4 |

[#]Peak value

TABLE 2

(Separator performance)

| Unit | Presence or absence of internal short circuit — After 1 cycle | Presence or absence of internal short circuit — After 5 cycles | Discharge capacity retention ratio after 50 cycles % | Capacity retention ratio after rate test % |
|---|---|---|---|---|
| Example 1 | Absent | Absent | 90 | 40 |
| Example 2 | Absent | Absent | 95 | 45 |
| Example 3 | Absent | Absent | 80 | 41 |
| Comparative Example 1 | Present | Present | — | — |
| Comparative Example 2 | Absent | Absent | 20 | 0 |
| Comparative Example 3 | Present | Present | — | — |
| Comparative Example 4 | Present | Present | — | — |
| Comparative Example 5 | Absent | Absent | 30 | 0 |
| Comparative Example 6 | Present | Present | — | — |
| Comparative Example 7 | Present | Present | — | — |

The following facts were found from the results of Table 2.

(1) From a comparison of Examples 1 to 3 with Comparative Examples 1 and 2, it was found that when the separator has an inorganic layer formed from fine inorganic particles such as to the extent that the 50% cumulative value $D_{50}$ is in the range of 100 nm to 500 nm, short circuits in the early phase caused by lithium dendrites do not occur, lithium dendrites are not generated even during high rate discharging, and the cycle characteristics and high rate characteristics are excellent.

(2) From a comparison of Examples 1 to 3 with Comparative Examples 3 and 4, it was found that when the separator uses inorganic particles which have a particle diameter having a particle diameter distribution in which the 10% cumulative particle diameter $D_{10}$ is $0.5D_{50}$ or more and the 90% cumulative particle diameter $D_{90}$ is $2D_{50}$ or less, in addition to being fine inorganic particles such as to the extent that the 50% cumulative value $D_{50}$ is in the range of 100 nm to 500 nm, short circuits in the early phase caused by lithium dendrites do not occur, and also, lithium dendrites are not generated even during high rate discharging.

(3) From a comparison of Examples 1 to 3 with Comparative Example 5, it was found that when an inorganic layer formed only of inorganic particles and having a uniform pore diameter is formed, a uniform voltage can be applied to the electrodes, and the cycle characteristics and high rate characteristics are excellent.

(4) From a comparison of Example 2 with Comparative Example 6, it was found that when the amount of addition of the alcohol is changed and the surface tension of the dispersion medium is changed to thereby adjust the surface contractile force to 20 kg/cm$^2$ or more, an inorganic layer having a uniform pore diameter can be formed, short circuits in the early phase caused by lithium dendrites do not occur, and also, lithium dendrites are not generated even during high rate discharging.

(5) From a comparison of Example 2 with Comparative Example 7, it was found that the formation of an inorganic layer with uniform pores does not depend on the concentration of inorganic particles.

INDUSTRIAL APPLICABILITY

The lithium ion secondary battery of the present invention can be used as a power supply of electronic devices such as camera-integrated VTRs, mobile phones, and laptop computers.

Thus, the present invention has been explained according to specific aspects, but modifications or improvements that are obvious to those having ordinary skill in the art, are also included in the scope of the present invention.

The invention claimed is:

1. A separator for lithium ion secondary batteries, comprising an inorganic layer formed from inorganic particles, and a porous base material consisting essentially of an organic resin and selected from a woven fabric, a knitted fabric, and a non-woven fabric, wherein the inorganic particles have a particle diameter distribution in which the 50% cumulative particle diameter $D_{50}$ is in the range of 100 nm to 500 nm, the 10% cumulative particle diameter $D_{10}$ is $0.5D_{50}$ or more, and the 90% cumulative particle diameter $D_{90}$ is $2D_{50}$ or less, and wherein the inorganic layer is formed on the porous base material.

2. The separator for lithium ion secondary batteries according to claim 1, wherein inorganic particles are present also in the voids of the porous base material.

3. A method for manufacturing the separator for lithium ion secondary batteries of claim 1, the method comprising:
 applying, on a porous base material consisting essentially of an organic resin and selected from a woven fabric, a knitted fabric, and a non-woven fabric, a dispersion liquid containing inorganic particles having a particle diameter distribution in which the 50% cumulative particle diameter $D_{50}$ is in the range of 100 nm to 500 nm, the 10% cumulative particle diameter $D_{10}$ is $0.5D_{50}$ or more, and the 90% cumulative particle diameter $D_{90}$ is $2D_{50}$ or less;
 drying the dispersion liquid; and
 thereby forming an inorganic layer formed from inorganic particles on the porous base material,
 wherein a dispersion medium having a surface contractile force, which acts on the inorganic layer formed from inorganic particles during drying, of 20 kg/cm² or more is used.

4. A lithium ion secondary battery using the separator for lithium ion secondary batteries according to claim 1.

5. A lithium ion secondary battery using the separator for lithium ion secondary batteries according to claim 2.

6. The separator for lithium ion secondary batteries according to claim 1, having a peak of pore diameters in the range of 0.04 μm to 0.08 μm.

7. The method according to claim 3, said separator for lithium ion secondary batteries having a peak of pore diameters in the range of 0.04 μm to 0.08 μm.

8. A method for manufacturing a separator for lithium ion secondary batteries, the method comprising:
 applying, on a porous base material consisting essentially of an organic resin and selected from a woven fabric, a knitted fabric, or a non-woven fabric, a dispersion liquid containing inorganic particles having a particle diameter distribution in which the 50% cumulative particle diameter $D_{50}$ is in the range of 100 nm to 500 nm, the 10% cumulative particle diameter $D_{10}$ is $0.5D_{50}$ or more, and the 90% cumulative particle diameter $D_{90}$ is $2D_{50}$ or less;
 drying the dispersion liquid; and
 thereby forming an inorganic layer formed from inorganic particles on the porous base material.

9. The separator for lithium ion secondary batteries according to claim 1, wherein the 10% cumulative particle diameter $D_{10}$ is between $0.5D_{50}$ and $D_{50}$ (including $0.5D_{50}$ and excluding $D_{50}$)", and the 90% cumulative particle diameter $D_{90}$ is between $D_{50}$ and $2D_{50}$ (excluding $D_{50}$ and including $2D_{50}$).

10. The method according to claim 3, wherein the 10% cumulative particle diameter $D_{10}$ is between $0.5D_{50}$ and $D_{50}$ (including $0.5D_{50}$ and excluding $D_{50}$)", and the 90% cumulative particle diameter $D_{90}$ is between $D_{50}$ and $2D_{50}$ (excluding $D_{50}$ and including $2D_{50}$).

* * * * *